April 9, 1968 E. J. BARCZAK 3,377,079
MEANS FOR RETAINING SELECTIVE ADJUSTMENT OF
ADJUSTABLE ROLLER SKATE TRUCK ASSEMBLIES
Filed Aug. 15, 1966
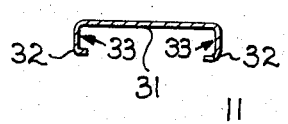
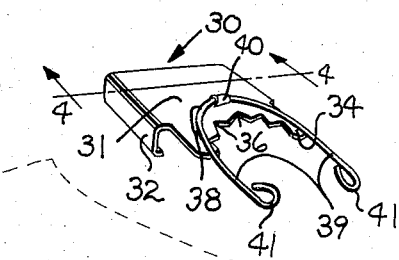
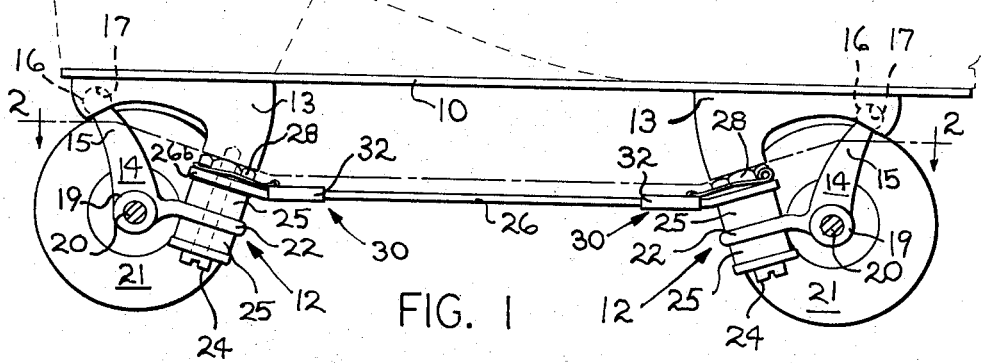
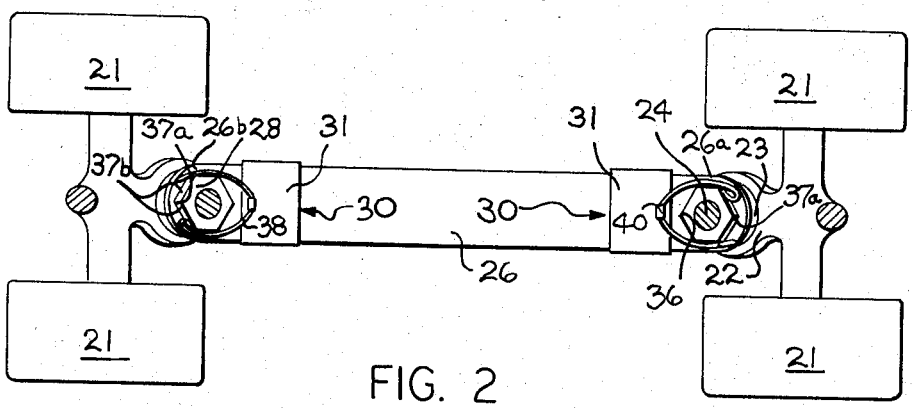
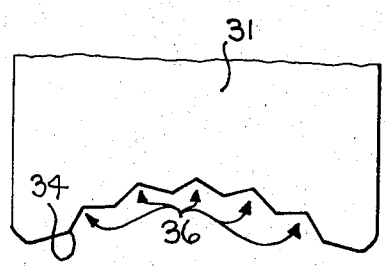
INVENTOR.
EDWARD J. BARCZAK
BY
ATTORNEYS

United States Patent Office 3,377,079
Patented Apr. 9, 1968

3,377,079
MEANS FOR RETAINING SELECTIVE ADJUSTMENT OF ADJUSTABLE ROLLER SKATE TRUCK ASSEMBLIES
Edward J. Barczak, 315 E. Oakland St., Toledo, Ohio 43608
Filed Aug. 15, 1966, Ser. No. 572,552
14 Claims. (Cl. 280—11.28)

The present invention pertains in general to an improved roller skate construction and especially to an improvement in a roller skate construction of the type provided with selectively adjustable, swivel-action, truck assemblies designed to swivel and accommodate and facilitate turning movements and motions of the skater in response to the application of shifting pressures exerted thereon as a consequence of a shifting of a skater's body weight.

According to conventional practice, the sensitivity of a roller skate truck assembly's responsiveness to shifts in the center of gravity of the skater's body weight may be selectively varied by suitable adjustment means which may be selectively tightened or loosened respectively to decrease or increase the extent of sensitivity of the truck assembly in conformity with the needs and desires of a particular skater. Moreover, conventional roller skate constructions commonly provide such selective adjustment of the sensitivity of the truck mounting assembly by means of a jam nut threadably affixed to a king bolt, or king pin, which is interconnected with the roller skate foot plate. Unfortunately, even during proper use of roller skate constructions of this type, there is an attendant jockeying movement of the truck assembly which tends to work the jam nut out of adjustment on the king bolt and thereby cause or permit an undesirable change in the sensitivity of the truck assembly. As a consequence, there is an attendant resulting change in the extent or degree of freedom of swivel motion of the truck assembly. Moreover, resilient cushions, customarily carried on the king bolt and sandwiched between the truck and the king bolt for cushioning and resilient adjustment purposes, tend to be non-uniformly stressed and distorted at various marginal and peripheral locations by the continual shifting of the body weight of the skater. As a consequence of being continually distorted, these resilient cushions impart and vary the pressure imparted against various portions of the adjustable jam nut. Thus, the jam nut is subjected to expensive torque and frictional stress which is another factor contributing to the tendency of the jam nut to work out of selected adjustment. The effects or torque become even more pronounced when, as is generally customary in a roller skating rink or arcade, the skater skates in one predominant circular direction. Obviously, changes in the sensitivity of the truck assembly are extremely undesirable and dangerous since they impair the balance and turning movements of the skater. Even more significantly, as a consequence of a loosening of the jam nut, the king bolt and the entire truck assembly may become unloosened and disassociated from the skate and thereby cause injury to the skater, as well as others in the vicinity of the skater.

Keeping the foregoing in mind, a principal objective of the present invention is the provision of means operative in association with a roller skate truck assembly which, in addition to facilitating selective adjustment of the truck assembly adjustment means, function to retain the roller skate truck assembly in proper selective adjustment during and throughout use of the roller skate until such time as a skater desires to effect a readjustment thereof.

Another objective is to provide means having the characteristics of the foregoing objective embodied in a structural member which is relatively simple in design and compatible with inexpensive manufacturing procedures.

Another objective of the present invention is the provision of means suitable for the accomplishment of the foregoing objectives, and which is also designed and constructed for use in cooperation and conjunction with adjustable truck assemblies of conventional design widely used by skaters and which does not necessitate substantial modificaton, change or alteration in such conventional truck assemblies in order to effectuate such objectives.

Another objective of the present invention is the provision of a retainer which is designed to engage the adjustment component, or member, of the truck assembly and retain the latter in a selectively located relationship with respect to the king bolt, or king pin, component of the truck assembly, and which may also be easily manually disengaged from the adjustment component to accommodate readjustment of the adjustment component.

Another particular objective of the present invention is the provision of a retainer capable of accomplishing the last-mentioned objective and which is also constructed in such manner that it will remain attached to the roller skate even when disengaged from the adjustment component.

Another more specific objective of the present invention is the provision in a roller skate construction of the type having a foot plate, a frame member, a truck assembly mounted for swivel movements relative to the foot plate and the frame member in response to shifting forces exerted thereon in supporting the shifting body movements of a skater, together with means comprising a yieldable member arranged to yieldably oppose swivel movements of the truck assembly, and adjustment means adjustable relative to the yieldable member to selectively adjust the yieldability of the yieldable member and cooperating therewith to adjustably control the swivel movement responsiveness of the truck assembly, in combination with the improvement comprising cooperating retainer means removably engageable with the adjustment means for securing the adjustment means and the yieldable member in selectively adjusted relationship when the retainer means is engaged with the adjustment means and for alternatively accommodating selective adjustment of the adjustment means when the retainer means is disengaged therefrom.

The specific nature of this invention, as well as other objects and advantages thereof, will, of course, become readily apparent to those skilled in the art from the following detailed description thereof, especially when considered in conjunction with the annexed sheet of drawings on which, by way of example only, there appears one preferred illustrated embodiment of the invention which is correlated with the ensuing description through the use of reference numerals which frequently reoccur to designate like parts throughout the drawings, and wherein:

FIG. 1 depicts a side elevational view of the lower portions of a roller skate construction provided with adjustable swivel action front and rear truck assemblies and embodying one preferred form of locking means of the present invention; and FIG. 2 represents a sectional view taken along and in the downwardly designated direction of the reference section line 2—2 appearing in FIG. 1; and FIG. 3 is an enlarged perspective view illustrating the individual structural features of the locking means depicted in FIGS. 1 and 2; and FIG. 4 is a sectional view of the locking means illustrated in FIG. 3, with the section being taken along and in the designated direction of the reference section line 4—4 appearing in FIG. 3; and FIG. 5 is a fragmentary plan view of one end portion of the locking means depicted in FIG. 3, and with the view being somewhat enlarged to more clearly portray certain novel structural features of the locking means.

In more specific detail, the roller skate construction, or assembly, depicted in FIG. 1 is generally representative of the type of roller skate commonly referred to as a "shoe skate" and is of the type ordinarily, but not necessarily, used by skaters while skating in indoor roller rinks and skating arcades. As is customary with a roller skate of this type, the roller skate is provided with adjustable swivel-action truck assemblies which facilitate the execution of intricate turning movements and figure skating maneuvers.

More specifically, the general overall construction of the roller skate is such that the skate includes such conventionally constructed and assembled component members as a foot plate 10, a shoe 11 with the sole thereof riveted or otherwise securely fastened to the upper side of the foot plate, and identical truck, wheel and adjustable king bolt assemblies 12 arranged in mutually spaced mirror-image tandem relationship beneath the forward, or toe, and the rearward, or heel, sections of the foot plate. In accordance with other conventional structural aspects, the roller skate construction also includes a pair of bearing blocks 13, which, like the manner of arrangement of the assemblies 12, are also arranged in tandem mirror-image relationship beneath the toe and heel sections of the foot plate 10, and in manner of function respectively provided a bearing joint accommodating swivel-type interconnection between each of the respective assemblies 12 and the foot plate 10. In still further conventional manner, there is a frame member, which, as shown, may be in the form of a tie bar 26 carried beneath and extending lengthwise of the foot plate 10 and having opposite end portions 26a and 26b, best observed in FIG. 2, interconnected respectively with one each of the assemblies 12.

One of the conventional primary functions of each of the assemblies 12 is, of course, to accommodate and facilitate relative swivel movement, or motion, during the course of skating movement. To this end, each of the assemblies 12 includes a truck 14 having a medial truck arm 15 provided with an outer substantially spherical or ball-shaped end 16 shaped to nest in cup and ball joint relationship in a recess 17 defined in the underside of each of the respective bearing blocks 13. Each truck 14 also includes a sleeve 19 which is disposed in normal angular relationship with the truck arm 15 and which extends laterally outward on opposite sides of the truck arm to provide an axial bore in which to receive and support an axle 20 carrying a freely rotatable wheel, or roller 21, on each oppositely extending end. Disposed radially from a medial portion of each sleeve 19 and arranged in generally quadrate spaced relationship with the truck arm 15, there is an integral annular ring, or seating collar 22, which defines, as best shown in FIG. 2, a generally oblate central opening, as at 23. Projecting loosely through the central opening, at 23, there is a king bolt 24 having an end portion threaded into the underside of the bearing block 13. Additionally, each assembly 12 also includes cushioning means which may be, as illustrated, in the conventional form of a pair of annular rubber cushions 25 arranged on the king bolt 24 on opposite sides of and in straddling relationship with the annular ring or seating collar 22. The king bolts 24 also pass through opposite respective end portions of the axially elongated tie bar 26 which serves as a frame member to interconnect and strengthen the assemblies 12.

Selective adjustment of the extent of freedom of pivotal or swivel movement of each assembly 12 is achieved by the provision of a selectively adjustable jam nut 28 which is threadably received on each respective king bolt 24. In customary manner, the jam nut 28 may be tightened or loosened to vary the extent to which the rubber cushions 25 are compressed and biased against opposite respective sides of each seating collar 22, and thereby regulate the freedom of swivel motion or movement of the truck arm 15 and, under proper threadable tightening or loosening adjustment of the king bolt 24 and jam nut 28, to regulate the degree of compression and bias necessary to correlate the freedom of swivel movement of the assemblies 12 with the body weight and balance of the skater or with the extent of swivel action desired by the skater. Otherwise stated, although different individuals ordinarily desire varying degrees of freedom of swivel movement of the assemblies 12, individual skaters customarily recognize that the greater the body weight of the skater, the more extensive should be the biasing of the swivel movement in order to compensate for the extra torque which, as a consequence of the additional body weight, is applied to each of the trucks 14 during skating. Conversely, a slightly built skater ordinarily desires a greater degree of freedom of swivel movement in order to achieve the same extent of responsiveness in turning movement that would be obtained by a heavier skater with a tighter adjustment of the assembly. Consequently, the heavier the body weight of the skater, the more tightly each jam nut 28 is ordinarily threaded onto each king bolt 24. Conversely, the lighter the body weight of the skater, the more loosely each jam nut 28 is ordinarily threaded onto each king bolt 24.

As has been more thoroughly discussed previously herein, in roller skate truck assemblies having a conventional construction, such as that discussed above, there is an ever present dangerous tendency for the adjustable jam nut 28 to gradually turn and work out of adjustment on the king bolt 24. This, of course, tends to impair the ability of the skater to maintain proper balance and maneuverability. In prevention of such undesirable and dangerous tendencies, the present invention affords means whereby a positive locking of each jam nut 28 in precisely adjusted position on each king bolt 24 can be accomplished. Moreover, the present invention is designed to prevent the jam nut from working out of such precise adjustment until such time as a skater desires to intentionally make further selective adjustments or readjustments of each jam nut. Still further, it will be apparent hereinafter that the locking means of the present invention is so designed and constructed that it may be assembled and carried on a skate and thus remain readily available and accessible to the skater without interfering with the proper function or operability of the roller skate.

In more particular respects, the present invention is embodied in snap-action locking means in the form of a pair of identical snap-action retainers, generally represented by the reference numeral 30, which are carried on each skate. Each retainer 30 has a body portion which is preferably formed and constructed from an easily shapable or moldable plastic or sheet metal material, or the like. As best observed in FIG. 3 and in the cross-sectional view thereof depicted in FIG. 4, the body portion is preferably formed as a unitary structure having a relatively thin and flat central portion 31 and having integral downwardly and inwardly bent side portions 32 extending lengthwise and along opposite sides of the flat central portion. As indicated in FIGS. 1 and 2, the retainers 30 are constructed and designed in such manner that they may be slidably received on and carried as a pair on the tie bar 26 of each skate; and, to this end, the inwardly bent side portions 32 are shaped to define a pair of longitudinally extending and oppositely facing C-shaped, guide-channels, at 33, along the underside of each retainer in which to slidably receive the elongated tie bar 26 when the latter is slipped axially endwise therein. Consequently, when the retainers 30 are both slidably assembled and arranged in back-to-back mirror-image relationship on the tie bar 26, the retainers are capable of being manually slipped along the tie bar into and out of engagement with the jam nuts 28.

FIGS. 1 and 2 are, of course, representative of the positioning of the retainers 30 when they are arranged in locking engagement with one each of the respective jam nuts 28 and positioned at opposite terminal ends of the tie bar 26.

To avoid the necessity of disassembling the tie bar 26 in order to initially install the retainers 30 on a previously assembled skate, the body portion of each of the retainers may be fabricated from a metal or plastic material possessing resiliency of sufficient extent to permit the inwardly bent side portions 32 of the retainers to be snapped directly over and onto the tie bar, while the latter remains interconnected with the assemblies 12.

Again with references to FIGS. 3 and 4, each retainer 30 has a locking end 34 on the jam nut facing end thereof which is recessed and defines a concave end surface 35 disposed in symmetrically centered relationship with the longitudinal axis of the retainer 30. Moreover, as best shown in FIG. 5, it will be observed that the end surface 35 of each retainer is not only concave but is also notched, or serrated, to provide a plurality of identical generally V-shaped serrations, or notches 36, which are shaped to nest in closely mating conformity around the triangulated configuration of the corners 37a formed at the confluence of each of the adjacent peripheral flats or sides 37b of the jam nuts 28.

Secured to the upperside of the flat central portion 31 of each retainer 30, there is a flexible, resilient, U-shaped spring clip 38 having a pair of legs 39, at least one of which is resiliently distensible, protruding axially outward beyond the serrated, or notched, locking end 34 of the retainer and defining a medial bight portion in which to receive and resiliently engrip a major peripheral portion of one of the jam nuts 28. For purposes of simplicity and economy, the manner of securement of the U-shaped spring clip 38 to the retainer 30 is, as illustrated, accomplished by the provision of a tang 40 struck out from the flat central portion 31 and which is capable of being crimped over the closed end of the U-shaped spring clip 38. Additionally, at least one of the legs 39 has a terminal end 41 which is bent or crimped inwardly towards the other leg to restrict the entrance between the legs 39. Although only one of the legs 39 needs to be resiliently distensible and only one of the legs need be provided with an inwardly bent terminal end, both legs may be, as illustrated, provided with these features.

By virtue of the foregoing, it will be observed that the structural features of the present invention are embodied in a novel snap-action locking means characterized by the retainer 30 which may be quickly slid along the frame member or tie bar 26 into locking engagement with the jam nut 28 after the jam nut has been selectively adjusted to the desired tightness on the king bolt 24. When the retainer 30 is slipped into engagement with the jam nut, the jam nut will distend at least one of the legs 39 and be received snugly within the bight portion between the legs 39. Contemporaneously, such engagement will cause the legs 39 to urge the locking end 34 of the retainer into snug abutting relationship with the jam nut 28 and urge the triangulated corners 37a of the jam nut 28 snugly into one or more of the notches or serrations 36 provided in the periphery of the locking end 34. Hence, the cooperative effect of the spring clips 30 and jam nuts 28, when engaged, is to draw the notched end portions 34 of the retainers into notched relatively interdigitated relationship with the periphery of the jam nuts 28, and to positively retain such relationship so that, during the course of skating, the jam nuts will be prevented from working out of properly selected adjustment on the king bolts 24. Moreover, each retainer 30 is designed and constructed in such manner that the retainer may, by simple manual manipulation, be disengaged from its respective jam nut and slid towards the center of the tie bar 26 to accommodate such selective readjustments of each of the jam nuts as the skater may desire from time to time.

It will, of course, be clearly evident from the preceding description that resort may be made to numerous structural modifications and variations without departure from the spirit and basic structural concepts of the invention disclosed herein, and it is, therefore, not the purpose herein to limit the invention otherwise than as may be necessitated by the scope of the appended claims.

I claim:

1. In a roller skate construction including a foot plate, a frame member, a truck assembly mounted for swivel movements relative to said foot plate and said frame member in response to shifting forces exerted thereon in supporting the shifting body movements of a skater, means cooperating with said truck assembly for controlling the swivel movement responsiveness of said truck assembly to said shifting forces, said last-mentioned means comprising a yieldable member arranged to yieldably oppose swivel movements of said truck assembly, and adjustment means defining a plural sided periphery for adjusting the yieldability of said yieldable member to thereby control the swivel movement responsiveness of said truck assembly; the improvement comprising retainer means having a fastening end defining a notched edge surface shaped to receive the plural sided periphery of said adjustment means in nested relationship therein and having a pair of mutually spaced legs projecting endwise beyond said fastening end and cooperating to accommodate a major peripheral segment of said adjustment means snugly between said pair of legs and dispose said notched edge surface in nested and peripherally interlocked relationship with the plural sided periphery of said adjustment means.

2. In a roller skate construction according to claim 1, wherein said pair of mutually spaced legs cooperate to define a U-shaped clip, and wherein at least one of said legs is resiliently distensible and cooperates with the other of said legs to accommodate a major peripheral segment of said adjustment means in snap-fit relationship therebetween to urge said notched edge surface into nested and peripherally interlocked relationship with the plural sided periphery of said adjustment means.

3. In a roller skate construction according to claim 1, wherein said adjustment means is threadably adjustable relative to said yieldable member, and wherein said retainer means includes a concave fastening end defining said notched edge surface, a U-shaped clip secured to said retainer means and provided by said pair of mutually spaced legs projecting endwise beyond said fastening end, at least one of said legs being resiliently distensible and at least one of said legs being provided with a biasing end portion converging inwardly towards the other leg and restricting the entrance to the space between said legs, said biasing end portion and said resilient leg cooperating under resilient stress to accommodate a major peripheral segment of said adjustment means snugly between said pair of legs and urge said notched edge surface into nested and peripherally interlocked relationship with the plural sided periphery of said adjustment means.

4. In a roller skate construction according to claim 1, wherein said adjustment means comprises a threadably adjustable fastener having a plural sided periphery, and wherein said pair of mutually spaced legs provide a U-shaped clip projecting outward beyond said fastening end, at least one of said legs being resiliently distensible and at least one of said legs being provided with a biasing end portion converging inwardly towards the other leg and restricting the spacing therebetween, said pair of legs also cooperating to peripherally encompass a major peripheral segment of said fastener in snap-fit relationship and bring said biasing end portion into biased peripheral contact with said fastener and thereby cooperate with said biasing end portion to urge said notched edge surface of said fastening end into peripherally interlocked relationship with the plural sided periphery of said fastener.

5. In a roller skate construction including a foot plate, a frame member, a truck assembly mounted for swivel movements relative to said foot plate and said frame member in response to shifting forces exerted thereon in supporting the shifting body movements of a skater, means cooperating with said truck assembly for controlling the swivel movement responsiveness of said truck assembly to said shifting forces, said last-mentioned means comprising a yieldable member arranged to yieldably oppose swivel movements of said truck assembly, and adjustment means shiftably adjustable relative to said yieldable member to selectively adjust the yieldability thereof and thereby control the swivel movement responsiveness of said truck assembly; the improvement comprising retainer means shiftably carried on said frame member for guided lineal movements between alternative spaced locations while remaining in cooperatively assembled relationship therewith, one of said alternative locations stationing said retainer means in snap-fit removable engagement with said adjustment means to secure the latter in selectively adjusted relationship with said yieldable member and another of said alternative locations orienting said retainer means in spaced non-engaging relationship with said adjustment means to accommodate selective readjustment of said adjustment means.

6. A roller skate construction according to claim 5, wherein said pair of mutually spaced legs are arranged to peripherally engage said adjustment means in snap-fit relationship when said retainer means is stationed in the first-mentioned one of said alternative locations.

7. In a roller skate construction according to claim 6, wherein said fastening end of said retainer means is peripherally notched to receive said plural sided peripheral configuration of adjustment means in peripheral interdigitated relationship when said legs are engaged in snap-fit relationship with said adjustment means.

8. In a roller skate construction according to claim 7, wherein said retainer means also includes a body portion having a pair of inwardly turned and oppositely facing side portions slidably straddling opposite sides of said frame member and holding said retainer means in assembled relationship on said frame member.

9. In a roller skate construction according to claim 8, wherein said body portion of said retainer means also includes an internally formed tang crimped over and securing said mutually spaced legs to said body portion.

10. In a roller skate construction including a foot plate, a pair of roller carrying truck assemblies mounted in tandem relationship for swivel movements beneath said foot plate responsive to shifting forces exerted thereon in supporting the shifting body weight of a skater, a frame member spanning between and terminally interconnecting with each of said truck assemblies, selectively adjustable means for selectively and adjustably controlling the swivel movement responsiveness of each of said truck assemblies relative to said shifting forces, said selectively adjustable means comprising a pair of resiliently yieldable members arranged to respectively yieldably oppose swivel movements of each of said truck assemblies and a pair of selectively rotatable fasteners each having a plural sided peripheral configuration and each being rotatably adjustable relative to said resiliently yieldable members to adjustably vary the yieldability thereof and to thereby selectively adjust the extent of opposition of each of said yieldable members to swivel movements of said truck assemblies, the improvement comprising a pair of identical retainers slidably carried in back-to-back mirror image relationship on said frame member, each of said retainers including a fastening end defining a notched edge surface shaped to receive one of said fasteners in peripherally nested and interdigitated relationship, a U-shaped clip secured to said retainer and having a pair of legs in mutually spaced relationship projecting endwise beyond said fastening end, at least one of said legs being resiliently distensible and at least one of said legs being provided with a biasing end portion converging inwardly towards the other leg and restricting the spacing therebetween, said biasing end portion also cooperating with the other of said pair of legs to receive one of said fasteners therein in snap-fit relationship and urge said fastening end and said fastener into nested and peripherally interlocked relationship.

11. In a roller skate construction according to claim 10, including the further improvement wherein each of said retainers includes a body portion having a pair of inwardly turned side portions straddling opposite sides of said frame member and holding said retainer in slidably assembled relationship thereon.

12. In a roller skate construction according to claim 10, including the further improvement wherein each of said retainers includes an integrally formed tang crimped over and securing one of said U-shaped clips to said body portion.

13. In a roller skate construction according to claim 10, including the further improvement wherein said fastening end of each of said retainers defines a concave end surface in which to receive one of said fasteners in nested relationship when the latter is engaged in snap-fit relationship with said retainer.

14. In a roller skate construction according to claim 10, including the further improvement wherein each of said retainers includes a body portion having a pair of resiliently distensible and inwardly turned side portions adapted to resiliently snap over and straddle opposite sides of said frame member and thereby hold said retainer in slidably assembled relationship on said frame member.

References Cited

UNITED STATES PATENTS

| 252,530 | 1/1882 | Simpson | 151—64 |
| 1,368,151 | 2/1921 | Horsfall | 151—62 |
| 2,510,722 | 6/1950 | Snyder | 280—11.28 |
| 2,578,911 | 12/1951 | Van Horn | 280—11.28 |

FOREIGN PATENTS 7,814     1909    Great Britain.

RICHARD L. JOHNSON, *Primary Examiner.*

M. L. SMITH, *Assistant Examiner.*